US012407975B2

(12) United States Patent
Ren et al.

(10) Patent No.: US 12,407,975 B2
(45) **Date of Patent: *Sep. 2, 2025**

(54) COAXIAL SPEAKER

(71) Applicant: AAC Microtech (Changzhou) Co., Ltd., Changzhou (CN)

(72) Inventors: Zhang Ren, Shenzhen (CN); Zhiwei Zhong, Shenzhen (CN); Qi Wang, Shenzhen (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/913,850

(22) PCT Filed: Jul. 20, 2022

(86) PCT No.: PCT/CN2022/106664

§ 371 (c)(1),
(2) Date: Sep. 23, 2022

(87) PCT Pub. No.: WO2024/000685

PCT Pub. Date: Jan. 4, 2024

(65) Prior Publication Data

US 2025/0133330 A1 Apr. 24, 2025

(30) Foreign Application Priority Data

Jun. 30, 2022 (CN) ........................ 202221717092.1

(51) Int. Cl.
*H04R 1/24* (2006.01)
*H04R 7/12* (2006.01)
(Continued)

(52) U.S. Cl.
CPC ............... *H04R 1/24* (2013.01); *H04R 7/127* (2013.01); *H04R 9/025* (2013.01); *H04R 9/045* (2013.01); *H04R 9/06* (2013.01); *H04R 2400/11* (2013.01)

(58) Field of Classification Search
CPC . H04R 9/025; H04R 7/16; H04R 1/24; H04R 9/06; H04R 9/063; H04R 9/02;
(Continued)

(56) References Cited

U.S. PATENT DOCUMENTS 12,120,495 B2 * 10/2024 Ren .......................... H04R 9/06
12,155,991 B2 * 11/2024 Ren ........................ H04R 9/046
(Continued)

FOREIGN PATENT DOCUMENTS

CN 201781608 U * 3/2011

*Primary Examiner* — Carolyn R Edwards
*Assistant Examiner* — Julie X Dang
(74) *Attorney, Agent, or Firm* — Wiersch Law Group

(57) ABSTRACT

The present invention provides a coaxial speaker including a frame, a magnetic circuit system, a first vibration system and a second vibration system fixed on different sides of the magnetic circuit system. The first vibration system locates communicated with the second vibration system. The first vibration system includes a first diaphragm and a first voice coil. The second vibration system includes a second diaphragm and a second voice coil. The magnetic circuit system includes a first magnetic gap and a second magnetic gap. The first voice coil partially locates into the first magnetic gap, the second voice coil partially locates into the second magnetic gap. The first diaphragm is used for generating bass sound, the second diaphragm is used for generating treble sound. A sound hole is provided on the first diaphragm for emitting the treble sound. Bass sound and treble sound form a full-range speaker, which providing high-quality sound.

8 Claims, 5 Drawing Sheets

(51) Int. Cl.
*H04R 9/02* (2006.01)
*H04R 9/04* (2006.01)
*H04R 9/06* (2006.01)

(58) Field of Classification Search
CPC ........... H04R 2400/11; H04R 2499/11; H04R 9/045; H04R 7/18
USPC .................................. 381/400–405, 409–412
See application file for complete search history.

(56) References Cited

U.S. PATENT DOCUMENTS

| | | | | |
|---|---|---|---|---|
| 2002/0168074 | A1* | 11/2002 | Miyamoto | H04R 9/10 381/182 |
| 2013/0195293 | A1* | 8/2013 | Ko | H04R 19/02 381/191 |
| 2021/0377668 | A1* | 12/2021 | Park | H04R 1/44 |
| 2023/0292037 | A1* | 9/2023 | Xu | H04R 1/24 |

* cited by examiner

COAXIAL SPEAKER

FIELD OF THE PRESENT INVENTION

The present invention relates to the field of electro-acoustic devices, and more particularly, to a coaxial speaker used in electronic speaker box products.

DESCRIPTION OF RELATED ART

Coaxial speaker refers to the speaker with the integration of the treble unit and bass unit, and the treble unit and bass unit are set coaxially. The sound source of the treble unit and bass unit of the coaxial speaker can be located in front of the coaxial speaker, that is, the two speaker units sounding along a same direction. The sound source of the treble unit and bass unit of the coaxial speaker can also be located in front and back of the coaxial speaker respectively, that is, the two speaker units sounding along different directions.

In related art, the treble unit and bass unit of the coaxial speaker usually each includes an independent vibration system and an independent magnetic circuit system, and the structure of the coaxial speaker is complex. The overall height of the coaxial speaker composed of the treble unit and the bass unit coaxially is increased, which leads to inconvenient installation due to the high height and reduces the applicability of the product. In addition, the separated treble magnetic circuit and bass magnetic circuit also increase the production cost, and reduce the market competitiveness of the product. In the related art, the effective area of the diaphragm in the speaker is limited, which cannot meet the requirements of the full sound range.

Therefore, it is desired to provide a new coaxial speaker which can overcome the above problems.

SUMMARY

In view of the above, the embodiment of the present invention provides a new coaxial speaker. By the present invention, the coaxial speaker has a compact structure and with high sound quality of the treble sound and bass sound.

The present invention provides a coaxial speaker including: a frame, a magnetic circuit system mounted on the frame, a first vibration system fixed on one side of the magnetic circuit system and connected with the frame, a second vibration system fixed on the other side of the magnetic circuit system. The second vibration system locates coaxially with and communicated with the first vibration system. The first vibration system includes a first diaphragm and a first voice coil driving the first diaphragm to generate sounds. The second vibration system includes a second diaphragm and a second voice coil driving the second diaphragm to generate sounds. The magnetic circuit system includes a first magnetic gap and a second magnetic gap located outside of the first magnetic gap. The first voice coil at least partially locates into the first magnetic gap, and the second voice coil at least partially locates into the second magnetic gap. The first diaphragm is used for generating bass sound, and the second diaphragm is used for generating treble sound. A sound hole is provided on the first diaphragm for emitting the treble sound generated by the second diaphragm.

As an improvement, the magnetic circuit system includes a magnetic bowl, the magnetic bowl including a side wall enclosing a channel and a bottom wall bending and extending from an end of the side wall closed to the first diaphragm, the magnetic circuit system further including a first magnet assembly disposed on one side of the magnetic bowl and a second magnet assembly disposed on the other side of the magnetic bowl, the first magnet assembly including a first magnet, the second magnet assembly including a second magnet and a third magnet located outside of the second magnet and spaced apart from the second magnet, the first magnetic gap formed between the first magnet, the second magnet, and the third magnet, the second magnetic gap formed between the second magnet and the side wall of the magnetic bowl.

As an improvement, a through hole is provided on the first magnet for communicating the channel of the magnetic bowl and the sound hole.

As an improvement, the second magnet assembly further includes a yoke supporting the second magnet and the third magnet, and the second diaphragm is mounted on a side of the yoke distal to the second magnet.

As an improvement, the coaxial speaker further includes a support shelf, and the second diaphragm fixed with the yoke through the support shelf.

As an improvement, the first vibration system further includes a voice coil support connecting the first diaphragm and the first voice coil, the first diaphragm including a first suspension, a first dome surrounding the first suspension, and a second suspension surrounding the first dome, the voice coil support connecting the first suspension, the first dome, and the second suspension to the first voice coil, an end of the first suspension mounted with the first magnet, an end of the second suspension mounted with the frame.

As an improvement, the second diaphragm includes a second dome, a third suspension surrounding the second dome and the third suspension fixedly attached with the support shelf.

As an improvement, the first magnet, the second magnet and the third magnet are magnetized along a vibration direction of the coaxial speaker, and the first magnet and second magnet are set opposite each other with a same pole, and the second magnet and third magnet are magnetized in opposite directions.

As an improvement, the coaxial speaker further includes an elastic assembly elastically suspending the first vibration system, the voice coil support including a flat portion attached to the first dome, a first extending portion bending and extending from one end of the flat portion to the first voice coil and connected to the first voice coil, and a second extending portion bending and extending from the other end of the flat portion to the elastic assembly and connected to the elastic assembly.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
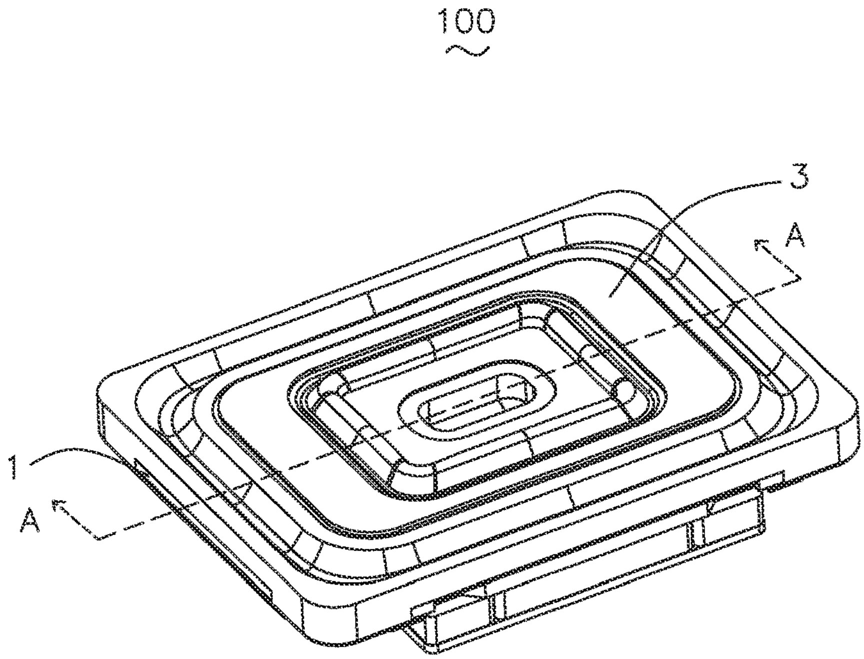
FIG. 1 is an illustrative isometric view of a coaxial speaker in accordance with one embodiment of the present invention.
Figure 2:
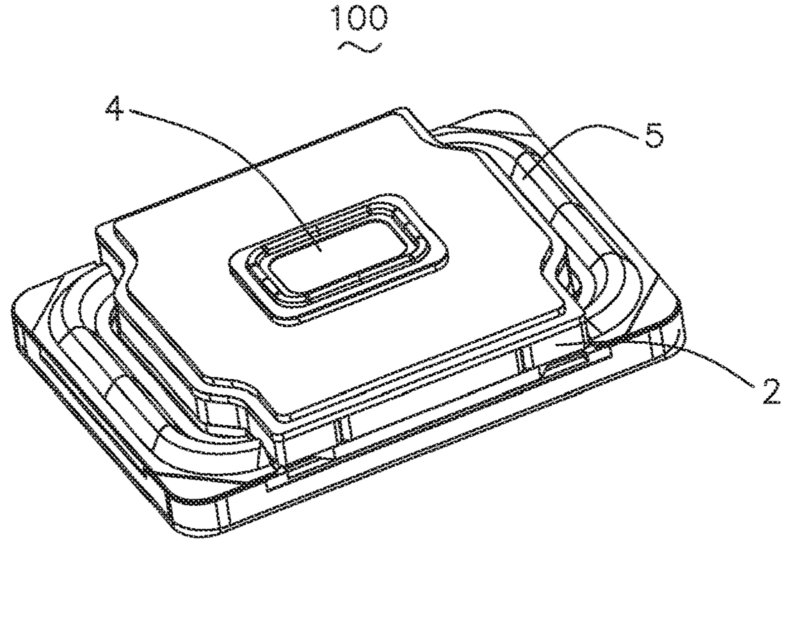
FIG. 2 is another illustrative isometric view of the coaxial speaker of FIG. 1.
Figure 3:
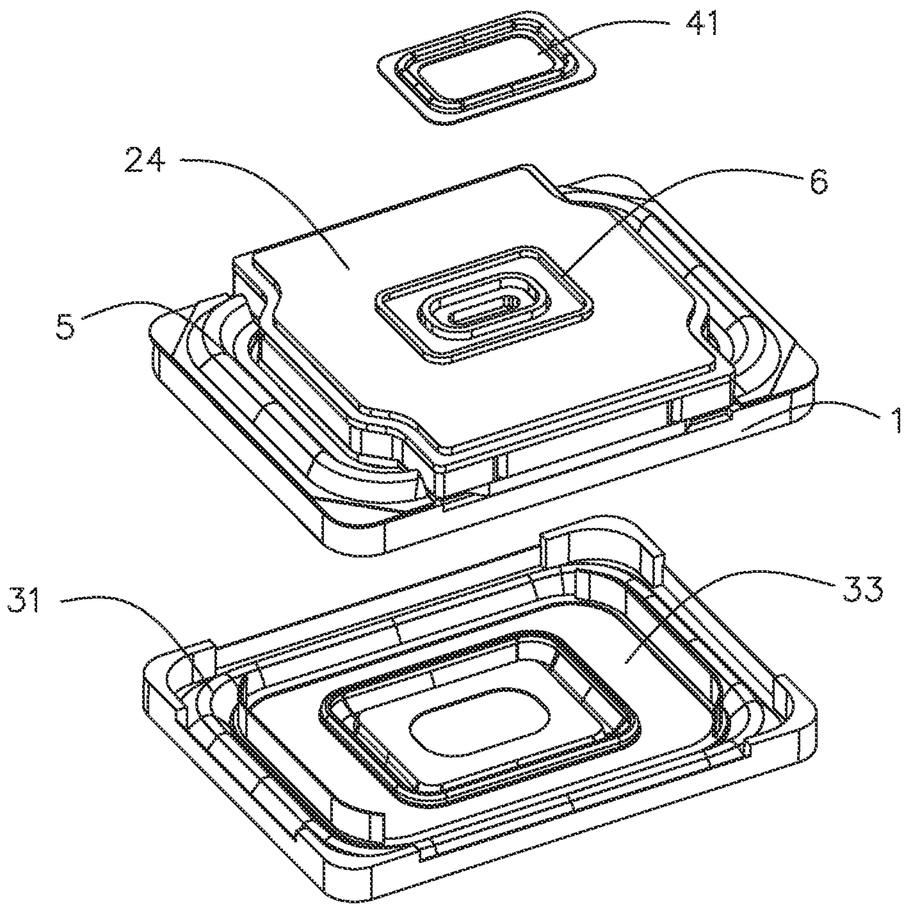
FIG. 3 is a partially exploded view of the coaxial speaker of FIG. 1.
Figure 4:
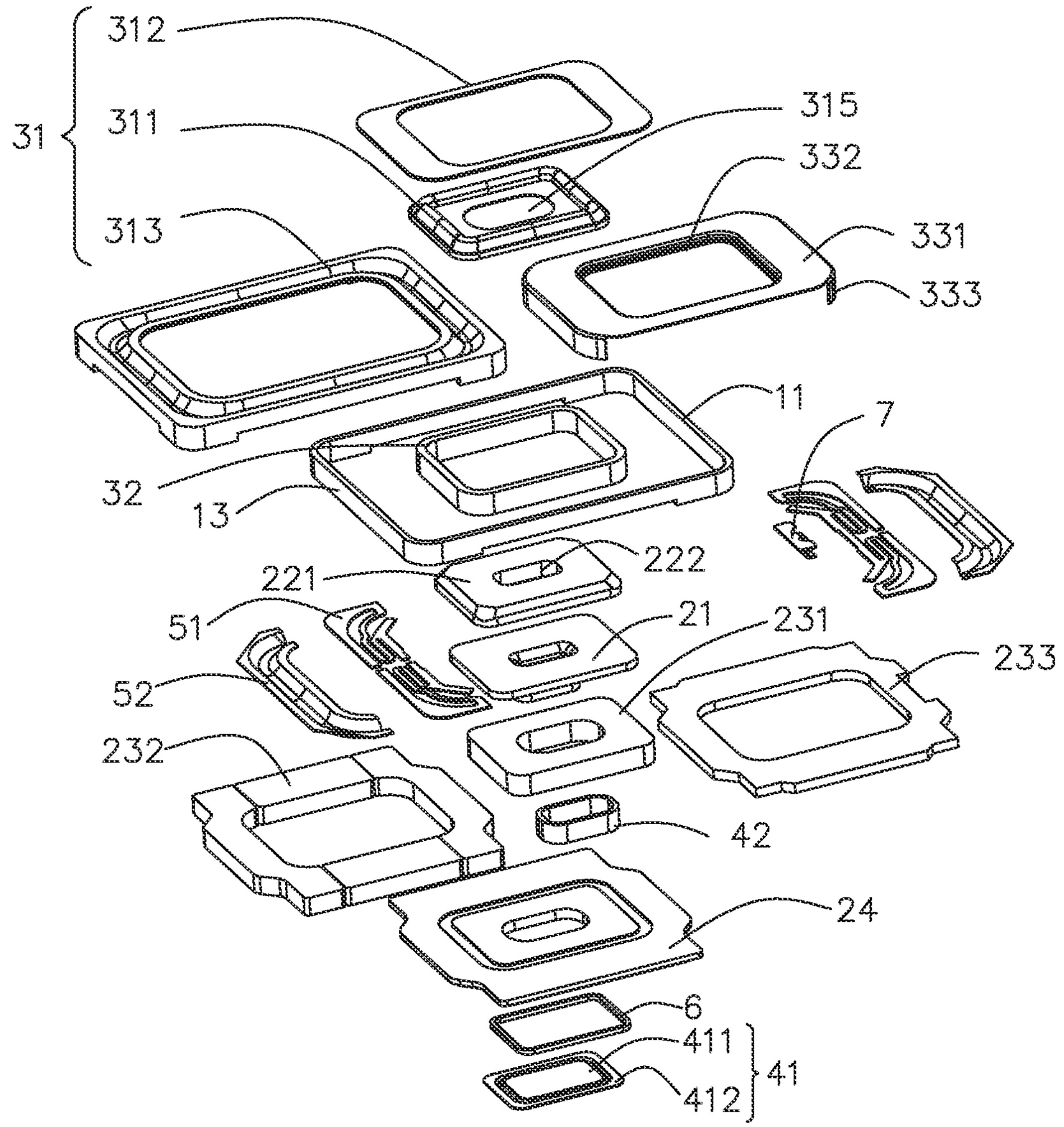
FIG. 4 is an exploded view of the coaxial speaker of FIG. 1.
Figure 5:
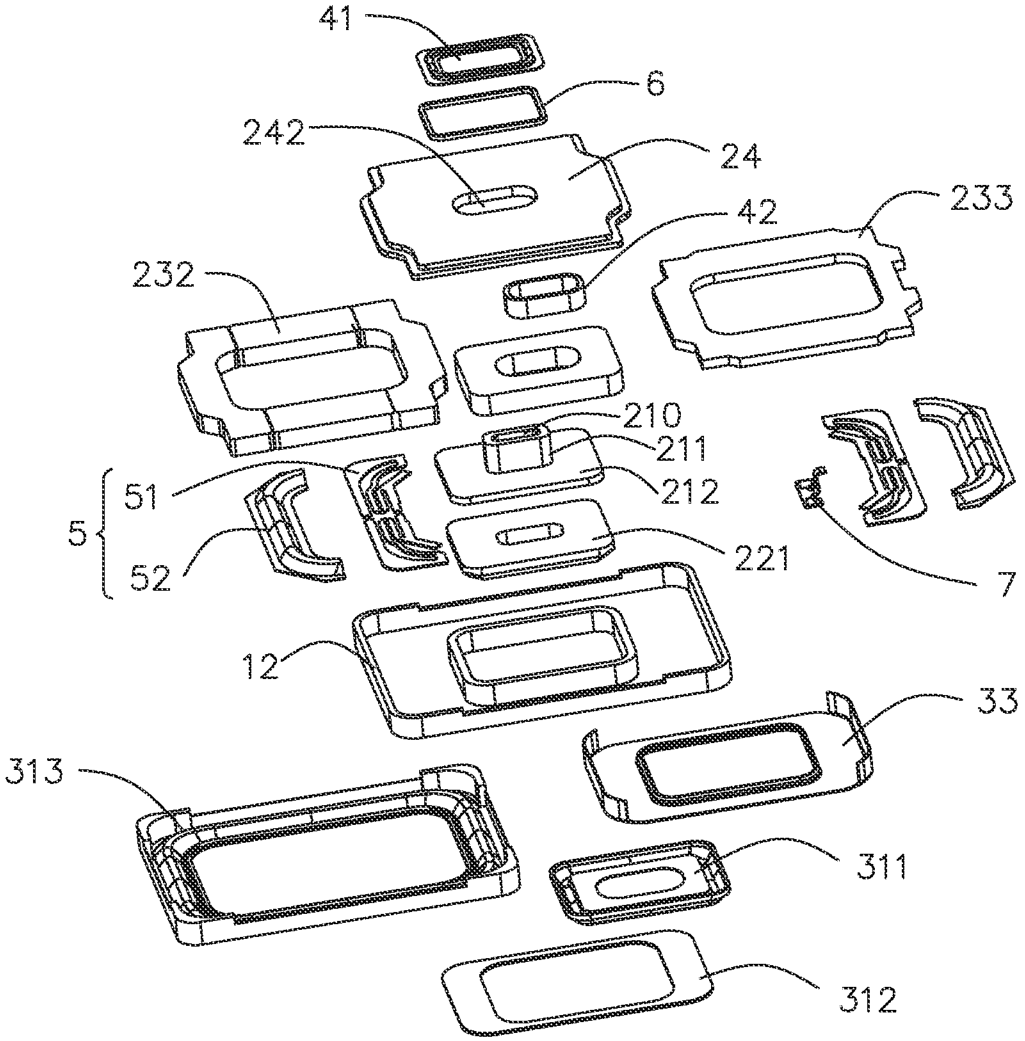
FIG. 5 is another exploded view of the coaxial speaker of FIG. 1.
Figure 6:
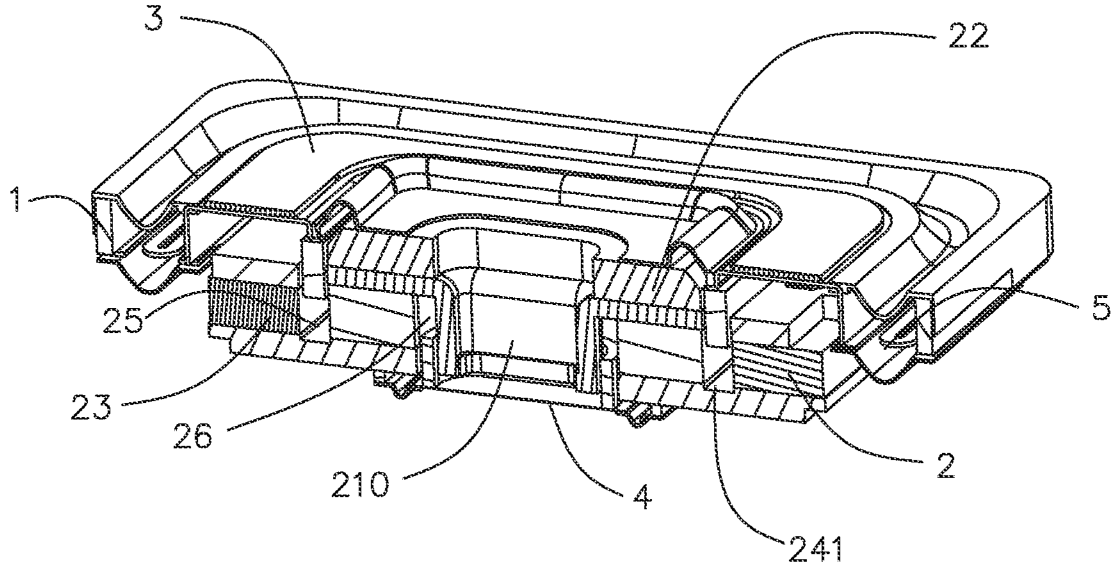
FIG. 6 is an illustrative cross-sectional view of the coaxial speaker taken along line A-A of FIG. 1.

Referring to the FIGS. 1-6, the present invention provides one embodiment of a coaxial speaker 100. The coaxial speaker 100 includes a frame 1, a magnetic circuit system 2 mounted on the frame 1, a first vibration system 3 fixed on one side of the magnetic circuit system 2 and connected with the frame 1, a second vibration system 4 fixed on the other side of the magnetic circuit system 2, an elastic assembly 5 elastically suspending the first vibration system 3, and a support shelf 6 fixing the second vibration system 4 to the magnetic circuit system 2. The first vibration system 3 locates coaxially with and communicated with the second vibration system 4.

The frame 1 is substantially rectangular, which can be a steel ring, and includes an upper surface 11, a lower surface 12 opposite to the upper surface 11, and an outer surface 13 connecting upper surface 11 and the lower surface 12. The first vibration system 3 is fixed to the upper surface 11 of the frame 1, and the elastic assembly 5 is fixed to the lower surface 12 of the frame 1.

The magnetic circuit system 2 includes a magnetic bowl 21, a first magnet assembly 22 disposed on one side of the magnetic bowl 21, and a second magnet assembly 23 disposed on the other side of the magnetic bowl 21. The first magnet assembly 22 locates coaxially with second magnet assembly 23. The magnetic bowl 21 includes a side wall 211 enclosing a channel 210 and a bottom wall 212 bending and extending from an end of the side wall 211 closed to the first vibration system 3. The first magnet assembly 22 includes a first magnet 221. The bottom wall 212 of the magnetic bowl 21 supports the first magnet 221. The first magnet 221 is an annular structure, and a through hole 222 is provided on a middle portion of the first magnet 221. The second magnet assembly 23 includes a second magnet 231, a third magnet 232 located outside of the second magnet 231 and spaced apart from the second magnet 231, and a magnetic guiding plate 233 located on the third magnet 232. The bottom wall 212 of the magnetic bowl 21 is stacked above the second magnet 231. The first magnet 221 is disposed opposite to the second magnet 231. The magnetic circuit system 2 further includes a yoke 24 supporting the second magnet 231 and the third magnet 232. A first magnetic gap 25 is formed between the first magnet 221, the second magnet 231, and the third magnet 232, the magnetic guiding plate 233. A second magnetic gap 26 is formed between the second magnet 231 and the side wall 211 of the magnetic bowl 21.

The first magnet 221, the second magnet 231 and the third magnet 232 are magnetized along a vibration direction of the coaxial speaker 100, and the first magnet 221 and second magnet 231 are set opposite each other with a same pole, that is, the first magnet 221 and the second magnet 231 are magnetized in opposite directions. The second magnet 231 and third magnet 232 are magnetized in opposite directions. In present embodiment, the first magnet 221, the second magnet 231, the third magnet 232, and the magnetic guiding plate 233 can all be hollow annular structures.

The first vibration system 3 includes a first diaphragm 31, a first voice coil 32 driving the first diaphragm 31 to generate sounds, and a voice coil support 33 connecting the first diaphragm 31 and the first voice coil 32. The first voice coil 32 is at least partially located into the first magnetic gap 25. The first diaphragm 31 is used for generating bass sound, and a sound direction of the first diaphragm 31 is upward along the vibration direction, that is, a sounding direction of the first diaphragm 31 is in front of the coaxial speaker 100. The first diaphragm 31 includes a first suspension 311, a first dome 312 surrounding the first suspension 311, and a second suspension 313 surrounding the first dome 312. The voice coil support 33 connects the first suspension 311, the first dome 312, and the second suspension 313 to the first voice coil 32. An end of the first suspension 311 is mounted with the first magnet 221, and the other end of the first suspension 311 is mounted with the voice coil support 33.

A recessing portion 241 is provided on the yoke 24 corresponding to a position of the first voice coil 32 to provide enough vibration space for the first voice coil 32. A perforating hole 242 is provided passing through the yoke 24 to facilitate a communication between the first vibration system 3 and the second vibration system 4.

A sound hole 315 is provided on the first diaphragm 31 for emitting the treble sound generated by the second vibration system 4. Specifically, the sound hole 315 is provided on the first suspension 311. The first dome 312 is fixedly attached to the voice coil support 33. One end of the second suspension 313 closed to the first dome 312 is mounted with the voice coil support 33, and the other end is mounted with the frame 1. Specifically, the other end of the second suspension 313 is attached to the upper surface 11 and extending to the outer surface 13 of the frame 1.

The second vibration system 4 includes a second diaphragm 41 and a second voice coil 42 driving the second diaphragm 41 to generate sounds. The second voice coil 42 is at least partially located into the second magnetic gap 26. The second diaphragm 41 is mounted on a side of the yoke 24 distal to the second magnet 231. The second diaphragm 41 is fixed to the yoke 24 through the support shelf 6. A height of the support shelf 6 should provide enough vibration space for the second diaphragm 41. The second diaphragm 41 is used for generating treble sound, and the sound direction of the second diaphragm 41 is upward or downward along the vibration direction, that is, the sounding direction of the second diaphragm 41 is in front or back of the coaxial speaker 100. When the second diaphragm 41 sounds in front of the coaxial speaker 100, the treble sound is emitted by passing through the through the channel 210, the through hole 222, and the sound hole 315 in sequence. The second diaphragm 41 includes a second dome 411 and a third suspension 412 surrounding the second dome 411. The third suspension 412 is attached to the support shelf 6, and the support shelf 6 is a hollow annular structure.

The elastic assembly 5 connects the voice coil support 33 and the frame 1. The elastic assembly 5 includes a circuit board 51 and a support membrane 52 connected with the circuit board 51. The first voice coil 32 is electrically connected to the circuit board 51. Specifically, the coaxial speaker 100 further includes a terminal 7 connected to the circuit board 51, and the first voice coil 32 is electrically connected to the circuit board 51 through the terminal 7. In this embodiment, the number of the elastic assemblies 5 is two, and each elastic assembly 5 is arranged in a direction of a short axis of the coaxial speaker 100. In other embodiments, the position of the elastic assembly 5 may be determined according to the situation.

The voice coil support 33 includes a flat portion 331 attached to the first dome 312, a first extending portion 332 bending and extending from one end of the flat portion 331 to the first voice coil 32 and connected to the first voice coil 32, and a second extending portion 333 bending and extending from the other end of the flat portion 331 to the elastic assembly 5 and connected to the elastic assembly 5.

The present invention provides a coaxial speaker including: a frame, a magnetic circuit system mounted on the frame, a first vibration system fixed on one side of the magnetic circuit system and connected with the frame, a second vibration system fixed on the other side of the magnetic circuit system. The second vibration system locates coaxially with and communicated with the first vibration system. The first vibration system includes a first diaphragm and a first voice coil driving the first diaphragm to generate sounds. The second vibration system includes a second diaphragm and a second voice coil driving the second diaphragm to generate sounds. The magnetic circuit system includes a first magnetic gap and a second magnetic gap located outside of the first magnetic gap. The first voice coil at least partially locates into the first magnetic gap, and the second voice coil at least partially locates into the second magnetic gap. The first diaphragm is used for generating bass sound, and the second diaphragm is used for generating treble sound. A sound hole is provided on the first diaphragm for emitting the treble sound generated by the second diaphragm. The coaxial speaker in present invention arranges an annular bass vibration system for providing bass sound, a treble vibration system disposed coaxially with the bass vibration system for providing treble sound. Bass sound and treble sound form a full-range speaker, providing high-quality sound. Two voice coils using a common part of the magnetic system can further reduce the cost and improve the acoustic performance. Furthermore, an overall height of the coaxial speaker of the present invention is reduced.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A coaxial speaker, comprising:

a frame;

a magnetic circuit system mounted on the frame, the magnetic circuit system comprising a first magnetic gap and a second magnetic gap, the first magnetic gap located outside of the second magnetic gap;

a first vibration system fixed on one side of the magnetic circuit system and connected with the frame, the first vibration system comprising a first diaphragm and a first voice coil driving the first diaphragm to generate sounds, the first voice coil at least partially located into the first magnetic gap, the first diaphragm used for generating bass sound; and a second vibration system fixed on the other side of the magnetic circuit system, the second vibration system located coaxially with and communicated with the first vibration system, the second vibration system comprising a second diaphragm and a second voice coil driving the second diaphragm to generate sounds, the second voice coil at least partially located into the second magnetic gap, the second diaphragm used for generating treble sound;

a sound hole provided on the first diaphragm for emitting the treble sound generated by the second diaphragm;

wherein the magnetic circuit system comprises a magnetic bowl, the magnetic bowl comprising a side wall enclosing a channel and a bottom wall bending and extending from an end of the side wall closed to the first diaphragm, the magnetic circuit system further comprising a first magnet assembly disposed on one side of the magnetic bowl and a second magnet assembly disposed on the other side of the magnetic bowl, the first magnet assembly comprising a first magnet, the second magnet assembly comprising a second magnet and a third magnet located outside of the second magnet and spaced apart from the second magnet, the first magnetic gap formed between the first magnet, the second magnet, and the third magnet, the second magnetic gap formed between the second magnet and the side wall of the magnetic bowl.

2. The coaxial speaker as described in claim 1, wherein a through hole is provided on the first magnet for communicating the channel of the magnetic bowl and the sound hole.

3. The coaxial speaker as described in claim 1, wherein the second magnet assembly further comprises a yoke supporting the second magnet and the third magnet, and the second diaphragm is mounted on a side of the yoke distal to the second magnet.

4. The coaxial speaker as described in claim 3, wherein the coaxial speaker further comprises a support shelf, and the second diaphragm fixed with the yoke through the support shelf.

5. The coaxial speaker as described in claim 1, wherein the first vibration system further comprises a voice coil support connecting the first diaphragm and the first voice coil, the first diaphragm comprising a first suspension, a first dome surrounding the first suspension, and a second suspension surrounding the first dome, the voice coil support connecting the first suspension, the first dome, and the second suspension to the first voice coil, an end of the first suspension mounted with the first magnet, an end of the second suspension mounted with the frame.

6. The coaxial speaker as described in claim 4, wherein the second diaphragm comprises a second dome and a third suspension surrounding the second dome, the third suspension fixedly attached with the support shelf.

7. The coaxial speaker as described in claim 1, wherein the first magnet, the second magnet and the third magnet are magnetized along a vibration direction of the coaxial speaker, and the first magnet and second magnet are set opposite each other with a same pole, and the second magnet and third magnet are magnetized in opposite directions.

8. The coaxial speaker as described in claim 5, wherein the coaxial speaker further comprises an elastic assembly elastically suspending the first vibration system, the voice coil support comprising a flat portion attached to the first dome, a first extending portion bending and extending from one end of the flat portion to the first voice coil and connected to the first voice coil, and a second extending portion bending and extending from the other end of the flat portion to the elastic assembly and connected to the elastic assembly.

* * * * *